United States Patent

[11] 3,627,651

[72] Inventors John Edward Colchester;
John Hubert Entwisle, both of Runcorn, England
[21] Appl. No. 804,660
[22] Filed Mar. 5, 1969
[45] Patented Dec. 14, 1971
[73] Assignee Imperial Chemical Industries Limited
London, England

[54] SYNTHESIS OF N:N'-DISUBSTITUTED BIPYRIDYLIUM SALTS
16 Claims, No Drawings
[52] U.S. Cl. .................................................... 204/73
[51] Int. Cl. .................................................... C07b 29/06, C07d 31/02
[50] Field of Search ........................................... 260/296 Y, 296 D, 270; 204/72–74

[56] References Cited
UNITED STATES PATENTS
3,210,360 10/1965 Bradbury et al. ............ 260/296 Y
FOREIGN PATENTS
1,075,323 Great Britain ............... 260/296 Y Primary Examiner—F. C. Edmundson
Attorney—Cushman, Darby and Cushman ABSTRACT: A process for the production of a 1,1'-disubstituted-4,4'-bipyridylium salt which comprises reducing electrolytically or by means of a reducing agent an N-substituted pyridinium salt having in the 4-position a substituent which is a good leaving group and which is capable of forming a stable anion particularly the cyanide group.

SYNTHESIS OF N:N'-DISUBSTITUTED BIPYRIDYLIUM SALTS

This invention relates to the synthesis of N,N'-disubstituted bipyridylium salts and particularly to a process for the production of 1,1'-disubstituted-4,4'-bipyridylium salts.

According to the present invention we provide a process for production of 1,1'-disubstituted-4,4'-bipyridylium salts which comprises reducing an N-substituted-pyridinium salt having in the 4-position a substituent which is a good leaving group and which is capable of forming a stable anion. By the term "stable anion" there is meant an anion which is capable of existing in association with a pyridinium cation.

The substituent on the nitrogen atom of the pyridine nucleus may be any inert substituent which does not interfere with the present reaction, for example a hydrocarbon radical, preferably an alkyl (e.g. methyl) of aralkyl group, or a substituted hydrocarbon group for example a carbamyl-alkyl and preferably a carbamyl-methyl group. The pyridinium salt may also carry inert substituents, for example alkyl groups, on the carbon atoms of the pyridine nucleus other than the four-carbon atom. These inert substituents should preferably not sterically hinder the 4-position.

The anion of the pyridinium salt may be any inert anion i.e. an anion which does not interfere substantially with the present reaction, and may be in particular a halide especially a chloride, sulfate or methylsulfate anion.

The reduction may be carried out electrolytically or by means of a reducing agent. Reducing agents suitable for use in the reaction include organic and inorganic reducing agents and we have found that particularly suitable are reducing agents having a redox potential more negative than −0.75 and preferably more positive than −1.09 volts in a aqueous medium as compared with the saturated calomel electrode. Suitable inorganic reducing agents include active metals, for example alkali metal amalgams, magnesium, aluminum and zinc, and metal compounds. When metals are used in solid form they are preferably used in a finely divided state to promote contact with the pyridinium salt. The reducing agent and the reaction conditions used should preferably be such that the substituent in the 4-position of the pyridinium salt is not hydrolyzed unduly and should also preferably be such that other substituents, for example the N-substituents on the pyridine nucleus, are not reduced.

Electrolytic reduction may be carried out in a manner and using apparatus conventionally used to carry out electrolytic reductions and may be conveniently carried out by the use of controlled-potential electrolysis. When using controlled-potential electrolysis we prefer to use an electrode potential in the range of from −0.75 volts to −1.09 volts and especially if the range −0.8 volts to −1.09 volts as compared with the saturated calomel electrode. We have found that use of potentials more negative than −1.16 volts tends to produce unwanted byproducts.

The 4-substituent on the pyridinium salt may be any which is known to make a good leaving group and which is capable of forming stable anions in the medium in which the reaction is carried out and may be in particular a cyanide group or a halide, for example a chloride, group. The 4-substituent is preferably of such a size as not to cause steric hindrance to coupling together of two pyridine nuclei.

The desired bipyridylium salt may be reduced under the conditions of the reaction to the bypyridylium cation radical but the radical can easily be oxidized back to the bipyridylium cation, for example by means of air.

Pyridinium salts are generally ionic solids which are soluble in polar solvents. It is therefore convenient in order to obtain intimate contact between the reducing agents and the pyridinium salt to use a solution of the pyridinium salt in a polar solvent. It is of course desirable that the reducing agent should not react with the solvent. We have found that water is a particularly convenient solvent for the pyridinium salt when the reducing agent, and in particular a metal, is used in a form which does not react with water to any appreciable extent under the reaction conditions. An alternative polar solvent is acetonitrile.

The reaction may be carried out very simply by mixing the pyridinium salt, conveniently as a solution, with the reducing agent at a temperature between 20° and 120° C. and preferably between 40° and 90° C. Suitable reaction times vary with the particular reagents and reaction conditions employed but are usually between 30 minutes and 24 hours.

We prefer to maintain the pH of the reaction medium at less than 10.0 and preferably less than about 8 in order to avoid any hydrolysis of the 4-substituent on the pyridinium salt and to avoid destruction of the bipyridylium salt which tends to occur in excessively alkaline media.

The pyridinium salt may be used in solution in a polar solvent in any concentration up to saturation; however very dilute solutions will involve the handling of a large volume of liquid and tend to be inconvenient.

The ratio of the amount of the reducing agent to the amount of the pyridinium salt should be such that sufficient reducing agent is present to add one electron to each pyridinium ion present.

The bipyridylium salts can be isolated from the reaction mixture by conventional techniques, for example by evaporation of excess solvent followed by crystallization of the bipyridylium salt from the remaining solvent, or by using techniques more fully described in U.K. Pat. Specification No. 1,073,824.

The invention is illustrated but in no way limited by the following examples, in which all parts and percentages are by weight.

EXAMPLE 1

1-methyl-4-cyanopyridinium iodide (10.7 g.) was dissolved in water (200 ml.) and zinc dust (3 g.) was added to the solution. The mixture was heated to 80°–100° C. in a container open to the air and maintained at that temperature for 75 minutes. Molar hydrochloric acid (200 ml.) was then added and the resulting solution was boiled to remove hydrogen cyanide gas. Polarographic analysis of the final solution showed 1,1'dimethyl-4,4'-bipyridylium ion to be present (0.93 g.—20 percent yield).

EXAMPLE 2

1-methyl-4-cyanopyridinium iodide (10.7 g.) was dissolved in water (100 ml. The solution was stirred for 5 minutes at room temperature in a container open to air with sodium amalgam (227 g.) containing 1 g. of sodium. The aqueous phase was separated and treated with molar hydrochloric acid (200 ml. and boiled to remove hydrogen cyanide gas. Polarographic analysis of the solution showed 1,1'-dimethyl-4,4'-bipyridylium ion to be present (0.33 g.—8 percent yield).

EXAMPLE 3

1-methyl-4-cyanopyridinium iodide (9.5 g.) was dissolved in water (200 ml.) and the solution was heated in a container open to the air with fine aluminum powder (3 g.) at 60°–80° C. with stirring, for 24 hours. The resulting solution was acidified with 1.28 molar hydrochloric acid (100 ml.) filtered and then boiled to remove hydrogen cyanide gas. The resulting solution was then analyzed polarographically and was found to contain 1,1'-dimethyl-4,4' -bipyridylium ion (0.2 g.—6 percent yield).

EXAMPLE 4

1-methyl-4-cyanopyridinium iodide (10.7 g.) was dissolved in water (200 ml.) and the solution was heated in a container open to the air with magnesium turnings (0.6 g.) for 21 hours at 80° C. (with stirring). The resulting solution was acidified, filtered and then boiled to remove hydrogen cyanide gas. The final solution was found to contain 1,1'-dimethyl-4,4'-bypyridylium ion (0.14 g.—3 percent yield).

EXAMPLE 5

1-methyl-4-cyanopyridinium methyl sulfate (6.6 g.) was dissolved in water (100 mls.) and the solution was added dropwise to a mixture of zinc dust (1.42 g.) in water (100 ml.) at a temperature of 80° C. The resulting mixture was purged with air and maintained in a well-stirred state for 1 hour at a temperature of 80° C. At the end of this time N/10 aqueous hydrochloric acid (200 ml.) was added and the mixture was warmed for 30 minutes to remove hydrogen cyanide gas. The resulting solution was found by polarographic analysis to contain a proportion of 1,1'-dimethyl-4,4'-bipyridylium salt corresponding to a yield of 26 percent based on the 4-cyanopyridinium salt fed to the reaction.

EXAMPLE 6

1-methyl-4-cyanopyridinium methyl sulfate (2.3 g.—0.01 mole) was dissolved in water (200 ml.) and the solution was poured into an electrolytic cell in which the anode compartment (platinum anode) was separated from the cathode compartment (mercury cathode) by a sintered glass disc. Nitrogen gas was passed continuously through the cathode compartment, and the cell was passed continuously through the cathode compartment, and the cell was connected to an Amel Potentiostat (model 556) so that there was a potential of −0.80 volt at the cathode (with reference to the saturated calomel electrode).

After 5 hours, the anolyte and catholyte were acidified, purged with air and analyzed polarographically for 1,1'-dimethyl-4,4'-bipyridylium salt and unreacted 1-methyl- 4-cyanopyridinium salt. The electrolyte was found to contain a 39 percent yield of the bipyridylium salt calculated on the pyridinium salt fed to the reaction and greater than 70 percent yield of bipyridylium salt calculated on the pyridinium salt consumed in the reaction.

EXAMPLE 7

The process of example 6 was repeated with the sole difference that the electrolyte contained as an additional ingredient of pH 7 buffer comprising 0.1 mole of disodium hydrogen phosphate and 0.1 mole of potassium dihydrogen phosphate. The yield of bipyridylium salt calculated on the pyridinium salt fed was found to be 39 percent.

EXAMPLE 8

4-chloro-1-methylpyridinium iodide (4.7 g.) was dissolved in water (100 ml.) and the solution was added to sodium amalgam (50 ml.) containing 0.4 sodium) under diethyl ether (200 ml.) The reaction mixture was purged with nitrogen gas and stirred for 30 minutes.

The ether layer was then separated and shaken with IN-aqueous hydrochloric acid in the presence of air. The yield of 1,1'-dimethyl-4,4'-bipyridylium dichloride calculated on the pyridinium salt fed was of the order of 10 percent, as detected by colorimetric analysis.

What we claim is:

1. A process for the production of 1,1'-disubstituted-4,4'-bipyridylium salt in a polar solvent which comprises reducing electrolytically at an electrode potential between −0.75 and −1.16 volts compared to a saturated calomel electrode or by means of a reducing agent which has a redox potential between −0.75 and −1.16 volts compared to a saturated calomel electrode in an aqueous medium an N-substituted pyridinium salt having in the 4-position a substituent which is a member selected from the group consisting of halogen and cyanide.

2. A process as claimed in claim 1 wherein the solvent is water,.

3. A process as claimed in claim 1 wherein the reduction is carried out at a pH of less than 10.0.

4. A process as claimed in claim 3 wherein the pH is less than 8.0.

5. A process as claimed in claim 1 wherein the reduction is carried out at a temperature of from 20° to 120° C.

6. A process as claimed in claim 5 wherein the temperature is from 40° to 90° C.

7. A process as claimed in claim 1 wherein an inorganic reducing agent is employed.

8. A process as claimed in claim 8 wherein the reducing agent is an active metal.

9. A process as claimed in claim 8 herein the metal is zinc.

10. A process as claimed in claim 8 wherein sodium amalgam is employed.

11. A process as claimed in claim 8 wherein the metal is in a finely-divided form.

12. A process as claimed in claim 1 wherein controlled-potential electrolysis is employed.

13. A process as claimed in claim 1 wherein the electrode-potential is from −0.75 volts to −1.09 volts.

14. A process as claimed in claim 1 which is carried out as a continuous operation.

15. A process as claimed in claim 1 wherein the 4-substituent of the pyridinium salt is the cyanide group.

16. A process as claimed in claim 1 wherein the 4-substituent of the pyridinium salt is halogen.

* * * * *